Feb. 1, 1966  B. F. FRYE ET AL  3,233,025
METHOD OF MAKING POLYURETHANES
Filed April 24, 1962

STEP 1 — REACTIVE COMPONENTS OF THERMOPLASTIC POLYURETHANE ARE PLACED IN AN EXTRUDER.

STEP 2 — REACTIVE COMPONENTS ARE HELD IN THE EXTRUDER UNTIL THERMOPLASTIC POLYURETHANE WITH A MELTING POINT OF 60°C. TO 250°C. IS FORMED.

STEP 3 — THERMOPLASTIC POLYURETHANE PASSED INTO A ZONE WHERE FURTHER REACTION OF THE -NCO GROUPS IS AVOIDED.

INVENTORS.
BERNARD F. FRYE
KENNETH A. PIGOTT
BY JAMES H. SAUNDERS

ATTORNEYS.

United States Patent Office 3,233,025
Patented Feb. 1, 1966

3,233,025
METHOD OF MAKING POLYURETHANES
Bernard F. Frye, Kenneth A. Pigott, and James H. Saunders, New Martinsville, W. Va., assignors to Mobay Chemical Company, Pittsburgh, Pa., a corporation of Delaware
Filed Apr. 24, 1962, Ser. No. 189,678
6 Claims. (Cl. 264—176)

This invention relates to polyurethane plastics and, more particularly, this invention relates to a method of preparing polyurethanes which are curable to form elastomeric products by the application of heat and pressure.

The accompanying flow sheet illustrates the steps of the claimed process.

Polyurethane plastics are well known and are prepared by the chemical reaction of an organic polyisocyanate with an organic compound containing at least two active hydrogen atoms as determined by the Zerewitinoff method, if desired, with the addition of an organic chain extending agent. The polyurethane elastomers are especially attractive for the preparation of solid elastomers commonly called polyurethane rubber because of the unusually high tear strength, abrasion resistance, elongation, shock absorption, hardness, flexibility, elasticity, solvent resistance and excellent resistance to oxygen aging. An advantageous mode of preparing polyurethane rubber is to first prepare a partially cured solid from the above-described components by allowing them to react below about 150° C. The intermediate products may be stored for a time and later fabricated under heat and pressure. This process is an improvement over the more conventional casting technique where an isocyanate terminated prepolymer is prepared in a first step and then mixed with a chain extending agent and cast in a mold. However, the process suffers from the disadvantage that the materials must be handled several times and that expensive equipment must be had in order to store and process the curable polyurethane plastic. For example, the reactive components of the polyurethane are mixed and then poured out onto waxed trays where the product is allowed to solidify, then it is scraped from the tray and subdivided prior to further processing. This method is only adaptable to a batch technique and requires either considerable labor or expensive and complicated machinery. Furthermore, the sheets or strips from the trays are difficult to process. The strips are elastic and the best previously known method of subdividing them involves passing strips of the material through a rotary knife type of grinder. This method has many disadvantages and a non-uniform product is obtained which has irregular surfaces that are unattractive and difficult to use.

It is, therefore, an object of this invention to provide a method of preparing polyurethanes which does not have the disadvantages set forth above. Another object of this invention is to provide an improved method of continuously producing polyurethane plastics from liquid reactive components capable of forming a polyurethane plastic. Another object of this invention is to provide a method of molding polyurethane plastics. A further object of this invention is to provide a method of extruding a solid curable polyurethane from a mixture of the liquid reactive ingredients thereof. Still a further object of this invention is to provide a method of producing curable polyurethane plastics in a single processing step.

The foregoing objects and others which will become apparent from the following description are accomplished in accordance with the invention, generally speaking, by providing a method of preparing a solidified substantially non-porous polyurethane wherein a mixture of liquid reactive components of said polyurethane is heated at a temperature of from about 60° C. to about 230° C. until a polyurethane having a melting point at some temperature between about 60° C. and about 250° C. is obtained, but which is a solid below 60° C. Then the polyurethane is extruded into a medium having a temperature below its melting point where it will solidify but not continue to react at an appreciable rate. The invention, therefore, contemplates the method of forming a liquid pourable reaction mixture of an organic polyisocyanate and an organic compound containing at least two active hydrogen containing groups as determined by the Zerewitinoff method, said groups being reactive with a —NCO group to form a urethane group and/or urea group, conveying the liquid reaction mixture to an extruder while the reaction mixture is still liquid, placing the liquid mixture in the extruder, and causing it to react sufficiently therein by maintaining the temperature between about 60° C. and about 230° C. so that it will retain the shape of the orifice of the extruder (i.e. it has an M.P. of 60–250° C.) and then extruding it through an orifice into an atmosphere where it will retain the shape imparted to it by the orifice.

Any suitable organic polyisocyanate may be used in the process of the present invention including aromatic, aliphatic and heterocyclic polyisocyanates. In other words, two or more isocyanato radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p′,p″-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Any suitable organic compound containing at least two active hydrogen containing groups as determined by the Zerewitinoff method, said groups being reactive with a —NCO group to yield urethane and/or urea groups, may be used in accordance with the present invention, but it is preferred to use a polyhydric polyalkylene ether, a polyhydric polythioether and most preferably a hydroxyl polyester obtained by a process which comprises condensing a polycarboxylic acid and a polyhydric alcohol.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with a hydroxyl number within the range of from about 25 to about 800 and acid numbers where applicable below about 5. These compounds most preferably have hydroxyl numbers of from about 20 to 250, the best results being obtained with those having a hydroxyl number from about 40 to about 100.

A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and other components can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose. They function as chain extending or cross-linking agents and are more fully disclosed below.

Any suitable hydroxyl polyester may be used as the organic compound having a molecular weight of above about 200 such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α,β-diethylsuccinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, hexene-1,6-diol, 1,7-heptane diol, diethylene glycol, glycerine, trimethylolpropane, 1,3,6 - hexanetriol, triethanolamine, pentaerythritol, sorbitol and the like. It is preferred that the major portion of the alcohols and acids be di- or trifunctional.

Any suitable polyhydric polyalkylene ether may be used such as, for example, the condensation product of an alkylene oxide or of an alkylene oxide with a polyhydric alcohol. Any suitable polyhydric alcohol may be used such as, those disclosed above for use in the preparation of the hydroxyl polyesters. Any suitable alkylene oxide may be used, such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable organic chain extending agent may be used in the process of the invention if desired, but it is preferred to use a polyamine or most preferably, a polyhydric alcohol. The chain extending agent should preferably have a molecular weight below about 500. Suitable chain extending agents are, for example, diaminodiphenylmethane, ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dichlorodinitrobenzidine and the like. The organic diamines are the most suitable polyamines. The amino alcohols, for example, those containing only one amino group, as a —NH$_2$ group, and one —OH group, such as, for example, ethanol amine, propanol amine and the like. Any suitable polyhydric alcohol may be used including, for example, ethylene glycol, propylene glycol, 1,3-butanediol, 1,4-butanediol, butene diol, butyne diol, xylylene glycols, amylene glycols, 1,4 - phenylene-bis-(β - hydroxy ethyl ether), 1,3 - phenylene - bis - (β - hydroxy ethyl ether), hexane diol, thiodiglycol, 1,2,6-hexanetriol, trimethylolpropane, glycerine, pentaerythritol and the like. It is preferred to use the dihydric alcohols as the organic chain extending agent.

In accordance with the method of the invention, a liquid mass capable of forming a polyurethane is prepared by mixing at least the organic polyisocyanate and an organic compound containing at least two active hydrogen containing groups as determined by the Zerewitinoff method. It is preferred to include in addition an organic chain extending agent in the reaction mixture either simultaneous with the mixture of the organic polyisocyanate and the organic compound containing active hydrogen containing groups or as a separate step where an excess of the organic polyisocyanate and an organic compound containing active hydrogen containing groups is reacted in a first step to prepare an isocyanato-terminated prepolymer. It is preferred to combine the components in such proportions that ratio of —NCO groups to active hydrogen atoms is within the range of about 1.02 to about 1.14. Thus, a —NCO:—OH ratio of about 1.02 to about 1.14 is most preferred.

The mixing of the components of the liquid mass capable of forming a polyurethane may be carried out in any suitable manner including combining the components on a machine mixer such as that disclosed in Reissue Patent 24,514. The outlet of this machine may be connected directly to an extruder and the liquid components from the mixture allowed to flow into the extruder where reaction takes place while mixing is continued to prepare the solid extrusions of the invention. The solid material is extruded into a medium having a temperature below the melting point thereof where it will solidify but not continue to react at an appreciable rate. The medium may be either liquid or gaseous. In other words, it may be an atmospheric medium such as air, nitrogen, argon or the like or a liquid medium such as paraffin oil, polydimethyl siloxanes having a viscosity of 20 centistokes at 50° C. or the like. Air or other gaseous atmosphere is preferred.

In accordance with a preferred embodiment of this invention, about 100 parts of a hydroxyl polyester having a molecular weight of from about 1000 to about 3000 and having essentially two free hydroxyl groups per molecule is reacted with from about 20 to about 100 parts of an organic diisocyanate and from about 1 to about 75 parts of a dihydric alcohol to obtain a liquid reaction mixture which is then flowed directly into an extruder where it is maintained at a temperature of from about 60° C. to about 230° C. until the product has a melting point of from about 60° C. to about 250° C.

and preferably above about 100° C. and then extruded to form an extruded shape. The extrusion may be cut into pellets as it is first extruded or stored for an extended period of time, if desired, preferably below about 50° C. and then cut into pellets and/or further processed to prepare finished articles including extrusions, compression moldings, injection moldings and the like. Storage of the material is best accomplished in an atmosphere containing less than 0.0055 lb. of water per pound of dry air.

In accordance with another preferred embodiment of this invention, the organic compound containing active hydrogen containing groups, the organic polyisocyanate and the organic chain extending agent are individually heated to a temperature of from about 60° C. to about 135° C. and then the organic compound containing active hydrogen containing groups and the organic chain extending agent are mixed with the organic polyisocyanate substantially simultaneously in an enclosed mixing zone by injection of the organic polyisocyanate and the organic chain extending agent into the more viscous organic compound containing active hydrogen containing groups. It is most preferred, however, to preheat and premix the organic compound containing active hydrogen containing groups and the organic chain extending agent and then intimately mix the heated organic polyisocyanate into said mixture. If the organic compound containing active hydrogen containing groups and the organic chain extending agent are preheated and premixed, even more rapid mixing of the organic polyisocyanate with the resulting mixture is thus facilitated. When this method is followed, one should only mix hydroxyl terminated compounds with the organic chain extending agents. Moreover, a small amount of a carboxylic acid and preferably, citric acid, in an amount of from about 0.001 to about 0.05 part by weight per hundred parts of the organic compound containing active hydrogen containing groups may be used in order to retard the reaction with the isocyanate, but this is seldom necessary in the process of the present invention because of the rapid intimate mixing and processing of the reactive components by injection mixing. On the other hand, it may be necessary to increase the rate of reaction of the active hydrogen containing component and the organic polyisocyanate and if this is desired, one may use any suitable catalyst to increase the rate of the reaction such as, for example, tertiary amines, such as N-ethylmorpholine, triethylene diamine and the like, as well as metal catalysts such as dibutyl tin-di-2-ethyl hexoate, stannous octoate, stannous oleate and the like.

As soon as the reaction components are completely mixed, they are conveyed directly into an extruder. Any suitable extruder type device may be used but it is preferred to use an extruder which not only forces the liquid reaction components through a chamber and through an orifice where they are ejected and retain the shape of the orifice, but which also continues to mix the reactive components. A suitable apparatus for performing this operation is set forth below. The resulting extrusions can then be subdivided to the desired particle size for subsequent molding or extruding operations. Any suitable method of cutting the extruded strands or sheets may be used, for example, a rotary knife or the like.

Extruding-type machines with single or double screws, and with screws or other mixing and extruding devices which move reciprocally in a direction parallel to their long axis have also been found to be suitable. Double screw machines so designed as to be self-cleaning are particularly suitable.

The polyurethanes of the invention are useful for the preparation of moldings, extrusions and the like in accordance with heretofore known processes and techniques. The extrusions may be stored or they may be used immediately in such processes. If the polyurethane is to be used for the preparation of finally cured extrusions, it may be placed in the hopper of an extruding device at room temperature and then heated within the extruder at a temperature between about 200° F. and about 450° F. to cause it to flow and thus extrude it into strands which have very good physical properties. It is preferred to further treat the extrusions for 12 to 24 hours at about 70° C. to about 110° C. Moreover, the extrusions may be chopped into pellets which may be compression molded by placing the pellets into a suitable mold which is preheated to a temperature of about 150° F. to about 400° F. to impart flowability to the polyurethane plastic. The melt is then pressed under high pressure of about 50 p.s.i. to about 1500 p.s.i. for about 1 to about 5 minutes and then the mold is cooled to a temperature below about 250° F. while the pressure is still being applied. After the temperature has fallen below about 250° F., the molding is removed from the press and cooled. The resulting shaped polyurethane piece is preferably further treated for about 12 to about 24 hours at a temperature of about 70° C. to about 110° C. It is also possible to use an injection molding technique and in this process the preferably pelletized extrusions are placed in the cylinder of the injection molding device through which the material is forced into a mold cavity and the material is maintained at a temperature of from about 200° F. to about 500° F. in the mold cavity. Since the mold itself is not heated, it is possible to remove the molded article within about 5 to 20 seconds after the injection of the curable polyurethane plastic therein. It may be desirable to maintain the moldings obtained by this technique at an elevated temperature of about 110° C. for about 12 to about 24 hours to effect final cure of the product and give optimum properties.

The process of the invention is particularly advantageous because it is not necessary to use several processing steps in the preparation of the polyurethane. On the contrary, commercially available materials may be purchased and put in the storage tanks of the apparatus and then metered into the injection mixing device and finally into the extruder where the extrusions are formed. This simple one-step method is a considerable improvement over the use of trays. Moreover, it was not to be expected that the liquid ingredients of a polyurethane could be placed directly into an extruder without sticking to the hot walls and causing fouling of the equipment.

The moldings of the invention are useful for the preparation of various articles by methods well known in the industry such as, for example, shoe heels, door stops, bearings, gear wheels and the like.

The invention is further illustrated by the following examples in which the parts are by weight unless otherwise indicated.

*Example 1*

About 100 parts of a hydroxyl polyester obtained by the condensation of adipic acid and ethylene glycol and having a hydroxyl number of about 56 and a molecular weight of about 2000 are heated to about 100° C. and mixed with about 9.4 parts of 1,4-butanediol which was at room temperature. The resulting mixture is heated again to 100° C. and then about 40 parts of 4,4'-diphenylmethane diisocyanate which has previously been heated to about 50° C. is added and the resulting liquid mixture is agitated for about 30 to about 45 seconds. The liquid mixture is then poured into the feed section of a ¾" extruder at the rate of about 14 grams per minute. The reaction mixture passes through a 15-inch zone which is heated to about 350° F. to the neck of the extruder which is at about 300° F. and out through a strand die which is at about 325° F. into air at a temperature of about 20° C. The resulting strand which has a diameter of about 0.07 inch is allowed to cool to room temperature, then the strand is passed through a cutter and thus reduced to about ⅛" to about ⅜" in length.

The ground material is stored for about one week and then passed through the same extruder under the same conditions. The resulting strands have the following physical properties:

| | |
|---|---|
| Tensile strength _____ lb./in.² | 6000 |
| Elongation _____ percent | 500 |
| Elongation set _____ do | 25 |
| 100% modulus _____ lbs./in.² | 600 |
| 200% modulus _____ lbs./in.² | 950 |
| 300% modulus _____ lbs./in.² | 1450 |
| Shore A hardness | 80 |

*Example 2*

About 100 parts of a hydroxyl polyester obtained by the condensation of adipic acid and ethylene glycol and having a hydroxyl number of about 56 and a molecular weight of about 2000 are heated to a temperature of about 100° C. and mixed with about 19 parts of the bis($\beta$-hydroxyethyl) ether of hydroquinone. The resulting mixture is heated to a temperature of about 100° C. and then about 40 parts of 4,4'diphenylmethane diisocyanate is added. The diisocyanate is previously heated to a temperature of about 50° C. and is agitated with the other components for about 30–45 seconds. Then the resulting mixture is poured into the feed section of an extruder modified to permit the screw to simultaneously rotate and move in a reciprocating fashion along its longitudinal axis. Pegs or teeth along the inside of the barrel of the extruder protrude into the space between the screw flights and the screw is split along the side of the threads in such a way that there is no contact between the teeth and the screw flights. The reaction mixture passes through the extruder, the cylinder temperature of which is about 125° C. and is exuded from the machine into air at a temperature of about 20° C. and re-extruded into solid strands. The solid strands after a 12 hour cure at 100° C. have the following physical properties:

| | |
|---|---|
| Tensile strength, p.s.i. | 5000 |
| Elongation, percent | 540 |
| Hardness, Shore B | 72 |

*Example 3*

The procedure of Example 2 is repeated except that a polyester obtained from adipic acid and 1,4-butane diol and having a hydroxyl number of about 54 is used, and the 19 parts of bis($\beta$-hydroxyethyl) ether of hydroquinone is replaced with 9 parts of 1,4-butane diol. Moreover, the cylinder temperature is about 120° C. The resulting strand after a 12 hour cure at 100° C. has the following physical properties:

| | |
|---|---|
| Tensile strength, p.s.i. | 5500 |
| Elongation, percent | 500 |
| Hardness, Shore B | 62 |

*Example 4*

Example 2 is repeated except that the polyester of Example 3 is used together with about 80 parts 4,4'-diphenylmethane diisocyanate and about 23 parts 1,4-butane diol. The cylinder temperature is raised to about 130° C. The resulting strand after a 12 hour cure at 100° C. has the following physical properties:

| | |
|---|---|
| Tensile strength, p.s.i. | 6500 |
| Elongation, percent | 450 |
| Hardness, Shore B | 78 |

*Example 5*

Example 2 is repeated except that about 60 parts of 4,4'-diphenylmethane diisocyanate is used together with about 33 parts of a bis($\beta$-hydroxyethyl) ether of hydroquinone and the cylinder temperature is increased to about 130° C. The resulting strand after a 12-hour cure at 100° C. has the following physical properties:

| | |
|---|---|
| Tensile strength, p.s.i. | 4500 |
| Elongation, percent | 450 |
| Hardness, Shore B | 82 |

*Example 6*

About 100 parts of a hydroxyl polyester obtained from adipic acid and 1,4-butane diol and having a hydroxyl number of about 54 is mixed with about 9 parts of 1,4-butane diol by heating the mixture to a temperature of about 100° C. with agitation. Then about 40 parts of 4,4'-diphenylmethane diisocyanate which has previously been heated to a temperature of 50° C. is added and the resulting liquid mixture is agitated for about 30–45 seconds and then poured into the feed section of a twin-screw extruder, the screw of which is self-cleaning and which is equipped with a rotating knife adjacent to the extruding die so that pellets are formed as the knife rotates to clip off the strands into short lengths as they are formed. The pellets fall away from the die into air at a temperature of about 20° C. When the resulting pellets are re-extruded, they exhibit excellent physical properties.

*Example 7*

About 100 parts of the polyester of Example 6 are mixed with about 9 parts of 1,4-butane diol and heated to a temperature of about 100° C. This mixture is then combined substantially simultaneously with about 40 parts of 4,4'-diphenylmethane diisocyanate which has previously been heated to a temperature of about 50° C. on a machine mixer as disclosed in Reissue Patent 24,514. The resulting liquid mixture is flowed directly from the discharge nozzle of the machine mixer to the feed section of a twin-screw extruder as disclosed in Example 6. The resulting pellets are exuded into an air atmosphere at about room temperature where they solidify.

*Example 8*

Example 7 is repeated except that the reaction product is extruded into a paraffin oil bath at a temperature of about 50° C. where it solidifies.

It is to be understood that the foregoing examples are given for the purpose of illustration and that any other suitable organic polyisocyanate, organic compound containing active hydrogen containing groups, organic cross linking agents, mixing device, extruder and the like could have been used in the foregoing examples providing that the teachings of the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for forming a thermoplastic polyurethane having free —NCO groups and a melting point of from about 60 to about 250° C. which comprises mixing the reactive components of said polyurethane which contain an excess of —NCO groups comprising an excess of an organic polyisocyanate and an organic compound containing at least two active hydrogen containing groups as determined by the Zerewitinoff method, passing the reaction mixture through a passageway while maintaining the temperature in said passageway within the range of from about 60° C. to about 250° C. at a rate such that the residence time in the passageway is less than sufficient to cause reaction of all of the —NCO groups in said mixture of reactive components, and removing the resulting polyurethane from said passageway to a zone where further reaction of the —NCO groups is avoided to produce a product having a melting point within the range of about 60 to about 250° C.

2. The method of claim 1 wherein said organic polyisocyanate is an organic diisocyanate and said organic compound containing at least two active hydrogen containing groups is a hydroxyl polyester obtained by a process which comprises condensing a polycarboxylic acid with an excess of a polyhydric alcohol.

3. The method of claim 2 wherein said organic polyisocyanante is an organic diisocyanate and said organic compound containing at least two active hydrogen containing groups is a dihydric polyester obtained by reacting a dicarboxylic acid with an excess of a dihydric alcohol.

4. The method of claim 2 wherein said polyurethane is removed from said passageway through a strand die and sub-divided into pellets.

5. A method for forming a thermoplastic polyurethane having free —NCO groups and a melting point of from about 60° C. to about 250° C. which comprises mixing the reactive components of said polyurethane which contain an excess of free —NCO groups comprising an excess of diphenylmethane diisocyanate, a dihydroxyl polyester obtained by a process which comprises condensing a dicarboxylic acid with a dihydric alcohol, said polyester having a molecular weight within the range of from about 600 to about 3000 and an organic chain extending agent having a molecular weight below about 500, passing the reaction mixture through a passageway while maintaining the temperature in said passageway within the range of from about 60° C. to about 250° C. at a rate such that the residence time in the passageway is less than sufficient to cause reaction of all of the —NCO groups in said reaction of said components and removing the resulting polyurethane from said passageway to a zone where further reaction of the —NCO groups is avoided to produce a product having a melting point within the range of 60° C. to 250° C.

6. The method of claim 5 wherein said dihydroxyl polyester is prepared by a process which comprises condensing adipic acid and ethylene glycol and said extending agent is a dihydric alcohol.

References Cited by the Examiner

UNITED STATES PATENTS

| | | | |
|---|---|---|---|
| 2,119,162 | 5/1938 | Hartner | 18—12 XR |
| 2,751,363 | 6/1956 | Martin | 260—9 |
| 2,764,565 | 9/1956 | Hoppe et al. | 18—48 |
| 2,996,756 | 8/1961 | Korsch et al. | 18—12 XR |
| 3,009,762 | 11/1961 | Kohrn et al. | 260—75 XR |
| 3,026,273 | 3/1962 | Engles | 18—48 |
| 3,036,042 | 5/1962 | Schmidt et al. | 260—75 |
| 3,170,972 | 2/1965 | Knipp et al. | 264—54 XR |

FOREIGN PATENTS 848,980  9/1960  Great Britain.

OTHER REFERENCES

Modern Plastics, "Polyurethane resins," by Bjorksten, Jr., April 1954, pp. 143, 144, 146, 228–230, 233.

Mobay publication: "The history of the development of polyester-urethane elastomers," by Saunders, J. H., March 21, 1962, all pages.

ALEXANDER H. BRODMERKEL, *Primary Examiner.*

LEON J. BERCOVITZ, *Examiner.*